US012782306B2

(12) United States Patent
Li et al.

(10) Patent No.: US 12,782,306 B2
(45) Date of Patent: Nov. 3, 2026

(54) METHOD FOR DETERMINING ELECTRIC POLARIZATION OF SOLID SYSTEM, AND ELECTRONIC DEVICE

(71) Applicant: Beijing Youzhuju Network Technology Co., Ltd., Beijing (CN)

(72) Inventors: Xiang Li, Beijing (CN); Yubing Qian, Beijing (CN); Ji Chen, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 211 days.

(21) Appl. No.: 18/679,246

(22) Filed: May 30, 2024

(65) Prior Publication Data

US 2024/0402111 A1 Dec. 5, 2024

(30) Foreign Application Priority Data

May 30, 2023 (CN) ........................ 202310632126.X

(51) Int. Cl.
*G01N 27/00* (2006.01)

(52) U.S. Cl.
CPC .................................. *G01N 27/007* (2013.01)

(58) Field of Classification Search
CPC ............................. G01N 27/00; G01N 27/007
See application file for complete search history.

(56) References Cited

U.S. PATENT DOCUMENTS

| | | | | |
|---|---|---|---|---|
| 2019/0171793 | A1 | 6/2019 | Aykol | |
| 2020/0167439 | A1* | 5/2020 | Mailoa | G06F 30/20 |
| 2020/0286595 | A1* | 9/2020 | Neukart | G16C 20/30 |

FOREIGN PATENT DOCUMENTS

| | | | |
|---|---|---|---|
| CN | 112784472 | A | 5/2021 |
| CN | 114627971 | A | 6/2022 |
| CN | 115166532 | A | 10/2022 |

OTHER PUBLICATIONS

Guangjun X., et al., "Quantum Neural Networks", Computer Science, No. 07, Dec. 31, 2001.
Li X., et al., "Ab initio calculation of real solids via neural network ansatz", Nature Communications , 2022, 16 pages.
Notification to Grant Patent Right for Invention for Chinese Application No. 202310632126.X, mailed May 27, 2025, 10 pages.

* cited by examiner

*Primary Examiner* — Tung X Nguyen
(74) *Attorney, Agent, or Firm* — Astute IP Law Group

(57) ABSTRACT

Embodiments of the present disclosure relate to a method and an apparatus for determining an electric polarization of a solid system, an electronic device, a computer-readable storage medium, and a computer program product. The method includes: determining a wave function of the solid system by inputting electron coordinates of a periodic unit of the solid system into a neural network and by minimizing an objective function, where the objective function is determined based on an enthalpy in the presence of an electric field; and determining an electric polarizability of the solid system based on the wave function of the solid system.

17 Claims, 6 Drawing Sheets

400

500

METHOD FOR DETERMINING ELECTRIC POLARIZATION OF SOLID SYSTEM, AND ELECTRONIC DEVICE

CROSS-REFERENCE TO RELATED APPLICATION

The present application claims the priority to Chinese Patent Application No. 202310632126.X, filed on May 30, 2023, and entitled "METHOD FOR DETERMINING ELECTRIC POLARIZATION OF SOLID SYSTEM, AND ELECTRONIC DEVICE", which is incorporated in its entirety herein by reference.

FIELD

Embodiments of the present disclosure mainly relate to a quantum system, and more particularly to a method and an apparatus for determining an electric polarization of a solid system, an electronic device, a computer-readable storage medium, and a computer program product.

BACKGROUND

Quantum mechanics is a subject that describes basic laws of microscopic quantum systems. Unlike classical computers that follow classical physical laws, quantum computing is implemented based on the microscopic quantum systems and via applying laws of quantum mechanics. In addition to molecular systems, solid systems are also important research systems that are focused on at present. A solid system is composed of periodically arranged nuclei and electrons moving freely therein. Due to the existence of the solid systems in all aspects of people's daily lives, the solid systems have extremely high research values.

The electric polarization of the solid system is related to many electric effects, such as a ferroelectric effect and a piezoelectric effect. The proposal of the modern polarization theory makes it possible to explain the electric polarization of the macroscopic solid systems from electronic computing of microscopic quantum mechanics. However, further researches are required for how to determine the electric polarization of the solid system based on the quantum mechanics.

SUMMARY

According to exemplary embodiments of the present disclosure, provided is a solution for determining the electric polarization of a solid system, in which a wave function of the solid system is obtained by utilizing a neural network, so as to determine the electric polarization thereof.

In a first aspect of the present disclosure, provided is a method for determining the electric polarization of a solid system, including: determining a wave function of the solid system by inputting electron coordinates of a periodic unit of the solid system into a neural network and by minimizing an objective function, wherein the objective function is determined based on an enthalpy in the presence of an electric field; and determining an electric polarizability of the solid system based on the wave function of the solid system.

In a second aspect of the present disclosure, provided is an electronic device, including: at least one processing unit; and at least one memory, coupled to the at least one processing unit and storing an instruction for execution by the at least one processing unit, wherein the instruction, when executed by the at least one processing unit, causes the electronic device to execute actions, including: determining a wave function of the solid system by inputting electron coordinates of a periodic unit of the solid system into a neural network and by minimizing an objective function, wherein the objective function is determined based on an enthalpy in the presence of an electric field; and determining an electric polarizability of the solid system based on the wave function of the solid system.

In a third aspect of the present disclosure, provided is an apparatus for determining the electric polarization of a solid system, including: a wave function determination unit, configured to determine a wave function of the solid system by inputting electron coordinates of a periodic unit of the solid system into a neural network and by minimizing an objective function, wherein the objective function is determined based on an enthalpy in the presence of an electric field; and a polarizability determination unit, configured to determine an electric polarizability of the solid system based on the wave function of the solid system.

In a fourth aspect of the present disclosure, provided is a computer-readable storage medium, storing a machine-executable instruction thereon, wherein the machine-executable instruction causes, when executed by a device, the device to execute the method described according to the first aspect of the present disclosure.

In a fifth aspect of the present disclosure, provided is a computer program product, including a computer-executable instruction, wherein the computer-executable instruction implements, when executed by a processor, the method described according to the first aspect of the present disclosure.

In a sixth aspect of the present disclosure, provided is an electronic device, including: a processing circuit, configured to execute the method described according to the first aspect of the present disclosure.

The Summary is provided to introduce a series of concepts in a simplified form, and these concepts will be further described below in the Detailed Description of Embodiments. The Summary is not intended to identify key features or essential features of the present disclosure, nor is it intended to limit the scope of the present disclosure. Other features of the present disclosure will become readily understood via the following description.

BRIEF DESCRIPTION OF THE DRAWINGS

The above and other features, advantages and aspects of various embodiments of the present disclosure will become more apparent in combination with the drawings and with reference to the following detailed description. In the drawings, the same or similar reference signs denote the same or similar elements, wherein.

DETAILED DESCRIPTION OF EMBODIMENTS

Figure 1:
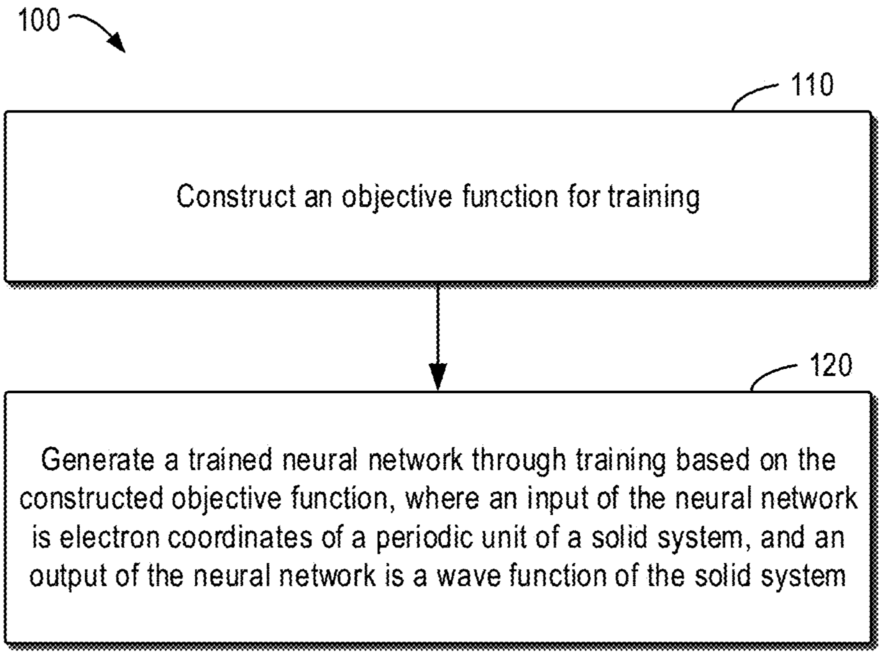
FIG. 1 illustrates a schematic flowchart of a process of generating a trained neural network according to embodiments of the present disclosure.

Hereinafter, embodiments of the present disclosure will be described in more detail with reference to the drawings. Although some embodiments of the present disclosure have been illustrated in the drawings, it should be understood that the present disclosure may be implemented in various forms and should not be construed as being limited to the embodiments set forth herein; and rather, these embodiments are provided to help understand the present disclosure more thoroughly and completely. It should be understood that the drawings and embodiments of the present disclosure are for exemplary purposes only and are not intended to limit the protection scope of the present disclosure.

Hereinafter, some basic terms involved in the present disclosure are first described with reference to Table 1.

TABLE 1

Terms

| No. | Term | Description |
|---|---|---|
| 1 | Microscopic | Represent an atomic size scale in the present disclosure. |
| 2 | Wave function | A function used for describing the state of a microscopic system. It may denote a wave function of an electron in the present disclosure. For example, an input is spatial coordinates of the electron, and a norm of an output is proportional to a probability of the electron appearing at that location. |
| 3 | Hamiltonian | Used for describing the energy of the microscopic system, and may be expressed as a Hermitian operator of the energy of a quantum system. For example, it denotes an operator (e.g., derivation, and the like) on the wave function in the present disclosure. |
| 4 | Enthalpy | Used for describing a thermodynamic parameter of the system. In the present disclosure, when an electric field is fixed, the difference between the enthalpies of two states is an energy difference of state transition. |
| 5 | Solid | A basic form of the presence of a substance. Its microscopic image is a pile of nuclei arranged periodically in a specific manner (about the order of $10^{23}$) and electrons moving freely therein. |
| 6 | Molecule | A composite system composed of a small number of atoms. |
| 7 | Electric dipole moment | A physical quantity used for measuring the separation status of positive and negative charge distribution. |
| 8 | Dielectric | A non-conductive substance, or referred to as an insulator. |
| 9 | Electric polarization | A phenomenon in which internal positive and negative charges of the dielectric in the electric field generate relative displacements, thereby forming an electric dipole moment. |
| 10 | Electric polarization density | The density of the electric dipole moment in the dielectric. |
| 11 | Electric polarizability | A physical quantity used for measuring the response of the dielectric to an electric field intensity. |
| 12 | Capacitivity | The capability of storing charges in a medium. |
| 13 | Primitive cell | A minimum repeating unit in a solid, and if periodic arrangement is performed according to this unit, the entire solid system may be covered. |
| 14 | Lattice vector | A vector used for describing the periodic arrangement mode of the solid system. |
| 15 | Reciprocal vector | An inverse of the lattice vector |

As mentioned above, the electric polarization of a solid system is related to electric effects, such as a ferroelectric effect and a piezoelectric effect. According to the proposal of the modern polarization theory, it is possible to investigate the electric polarization of the solid system in the case of an applied electric field, for example, the electric polarization may be characterized as physical quantities such as polarizability and capacitively.

Although the theory has been substantially mature, the existing calculation methods have respective limitations in terms of calculating the electric polarization of the solid system, thus no matter the calculation precision or the scale of a simulation system is greatly limited. Therefore, there is a need for a more efficient and accurate method to determine the electric polarization of the solid system.

In view of above, embodiments of the present disclosure provide a solution for determining the electric polarization of a solid system, in which a wave function of a primitive cell of the solid system under the action of an electric field is determined by a neural network when an objective function is minimized, and thus the average polarizability of the solid system can be determined. In the solution, the periodicity of the solid system is considered, so that the calculation amount of processing is reduced, and the processing efficiency is improved; and moreover, since the wave function is determined by using the neural network, the precision of determining the polarizability can be improved.

FIG. 1 illustrates a schematic flowchart of a process 100 of generating a trained neural network according to embodiments of the present disclosure. In block 110, an objective function for training is constructed, where the objective function is determined based on an enthalpy in the presence of an electric field. In block 120, the trained neural network is generated through training based on the constructed objective function, where the input of the trained neural network is electron coordinates of a periodic unit of the solid system, and the output is a wave function of the solid system.

The network structure of the neural network is not limited in embodiments of the present disclosure, for example, the neural network may be a convolutional neural network, a recurrent neural network, an auto-encoder, and the like. The neural network may include various types of layers, such as a feature extraction layer, a convolutional layer, a pooling layer, and the like. It can be understood that, a machine learning method has been widely applied to physical researches and has achieved greater successes in some fields, and in embodiments of the present disclosure, the machine learning method may be applied to the solid system by using the neural network that generates the wave function.

It should be noted that, in embodiments of the present disclosure, the term "solid system" may also be referred to as a solid or a system for short, which is not limited in the present disclosure. The solid system has a periodicity, for example, the solid system includes a plurality of primitive cells, for example, the primitive cell is a minimal repeating unit of the solid system. It can be understood that, the solid system in embodiments of the present disclosure may include any solid structure having central symmetry, such as a one-dimensional hydrogen chain, two-dimensional graphene, three-dimensional lithium hydride, and the like, which is not limited in the present disclosure.

In some embodiments, the neural network may have a parameter which represents an electric field intensity, e.g., an environmental parameter, which is expressed as F. In some examples, the direction of an electric field may be expressed as a direction x, for example, the electric field may also be expressed as Ex.

The input of the neural network may be the electron coordinates of the periodic unit of the solid system, wherein the periodic unit may be a primitive cell or a supercell composed of a plurality of primitive cells. In some examples, the electron coordinates of electrons and atoms in the periodic unit may be periodically processed, to serve as the input of the neural network. In this way, the input of the neural network can conform to the own structure of the solid system. The output of the neural network may be the wave function, wherein the wave function includes a real part and an imaginary part.

Figure 2:
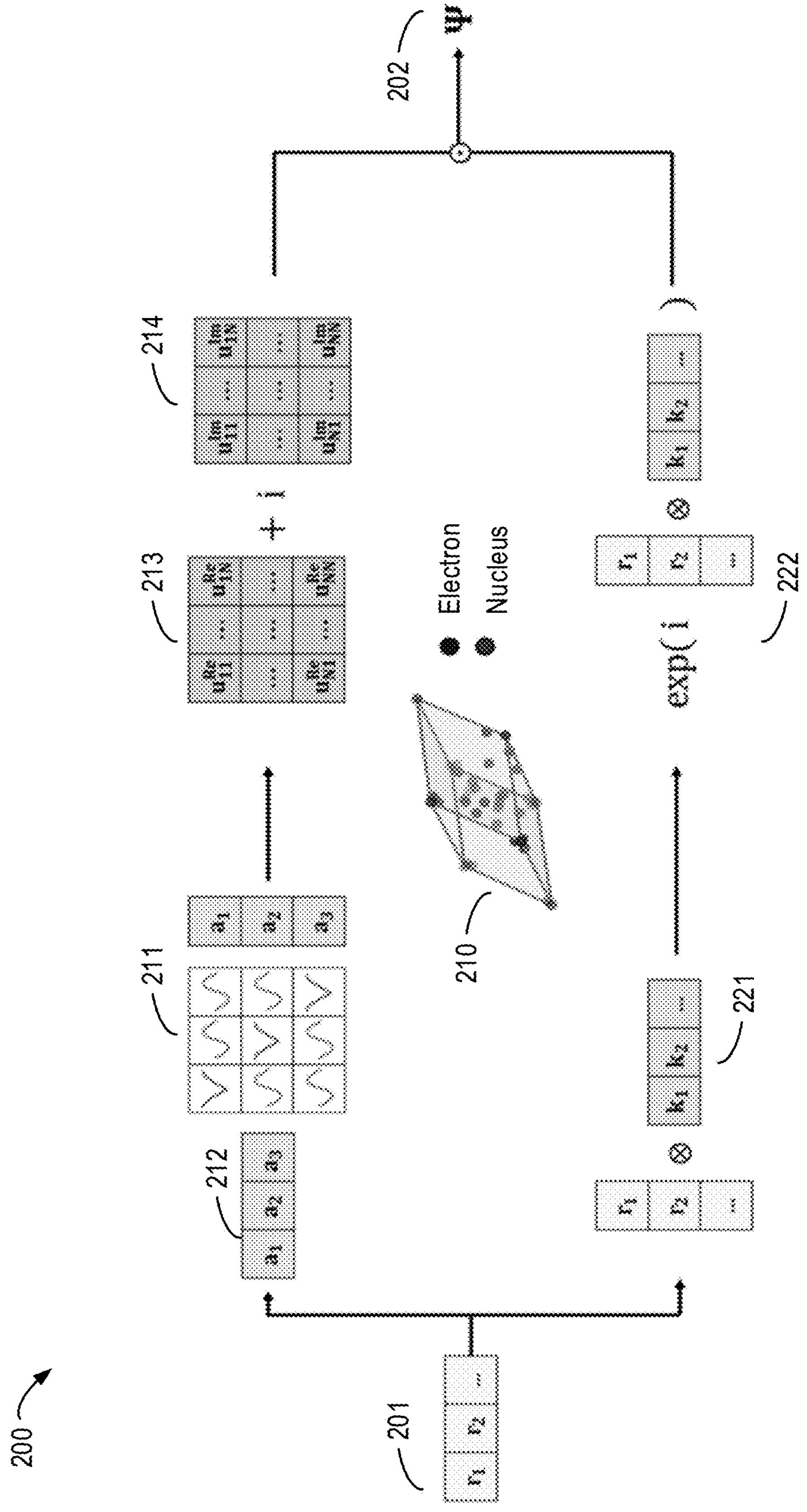
FIG. 2 illustrates a schematic diagram of a neural network according to embodiments of the present disclosure.

FIG. 2 illustrates a schematic diagram of a neural network 200 according to some embodiments of the present disclosure. As shown in FIG. 2, a primitive cell 210 (i.e., a periodic unit) includes a plurality of nuclei and a plurality of electrons. The input of the neural network is electron coordinates 201 of the primitive cell 210, and the output of the neural network is a wave function 202 of the primitive cell 210.

Periodicity and anti-symmetry are two fundamental properties of the wave function of the solid system. The anti-symmetry may be ensured by the Slater determinant. In embodiments of the present disclosure, the neural network may include two channels, so that the wave function may be denoted by two Slater determinants of one spin-up channel and one spin-down channel.

Specifically, the electron coordinates 201 may be input into the two channels. In the first channel, a periodic distance feature is constructed by using a periodic metric matrix 211 and a lattice vector 212, and then the periodic distance feature is fed into two molecular neural networks 213 and 214, so as to obtain the real part and the imaginary part of the wave function, respectively. In the second channel, a plane-wave phase factor 222 may be constructed on a selected subset of crystal momentum vectors 221. Further, combination may be performed based on the outputs of the two channels, so as to obtain the output of the neural network, i.e., the wave function 202.

It can be understood that the neural network 200 shown in FIG. 2 is only for illustration, and embodiments of the present disclosure are not limited thereto, for example, in some examples, the second channel shown in FIG. 2 may be omitted; and for example, in some other examples, the input of the neural network may be electron coordinates of a supercell including a plurality of primitive cells.

In embodiments of the present disclosure, an objective function may be constructed, and the neural network may be trained by minimizing the objective function. For example, the wave function may be randomly initialized, and an initialized objective function may be constructed based on the initialized wave function. Then, the objective function may be updated by iteration, so as to minimize the objective function.

In some examples, the objective function may be referred to as an enthalpy function, which denotes an enthalpy in the presence of an electric field, the objective function may also be referred to as an electric field enthalpy or an electric field enthalpy function, and the like, which is not limited in the present disclosure. Exemplarily, the enthalpy (or the objective function) is associated with at least one of the following: Hamiltonian, the wave function, the volume of the periodic unit, the electric field, and an electric polarization density. For example, the input of the neural network is the electron coordinates of the periodic unit (e.g., the primitive cell 210) of the solid system, and then the Hamiltonian in the objective function refers to the Hamiltonian of the periodic unit, and the volume in the objective function refers to the volume of the periodic unit. For example, the wave function in the objective function corresponds to the output of the neural network. For example, the electric polarization density is related to the wave function.

Optionally, the enthalpy (or the objective function) may be expressed as a difference value between: a product of the Hamiltonian and the wave function; and a product of the volume, the electric field, and the electric polarization density. In embodiments of the present disclosure, the objective function may be expressed as formula (1) as follows:

$$F[\psi] = H\psi - \Omega E \cdot P[\psi] \tag{1}$$

In formula (1), $F[\psi]$ denotes that the objective function F is related to the wave function $\psi$, H denotes the Hamiltonian, $\Omega$ denotes the volume of the periodic unit, E denotes the electric field, P denotes the electric polarization density of the system, and $P[\psi]$ denotes that the electric polarization density P is related to the wave function $\psi$.

It can be understood that, the Hamiltonian H may be obtained by using an existing method, which is not limited in the present disclosure.

In some embodiments, the electric polarization density may be determined based on the following factors: the volume of the periodic unit, the coordinates of each nucleus, the coordinates of each electron, a lattice vector, and a reciprocal vector. Exemplarily, the electric polarization density may be based on average potential energy in the periodic unit. For example, the electric polarization density may be associated with a complex coordinate function, wherein the complex coordinate function may be expressed as $\tilde{U}_i(r)$. Optionally, the complex coordinate function may also be referred to as a periodic coordinate function or other names, which is not limited in the present disclosure.

In some embodiments, the complex coordinate function may be expressed as a first sub-function. In some other embodiments, the complex coordinate function may be expressed as a weighted sum of a first sub-function and a second sub-function, and a weight of the second sub-function may be associated with the wave function. An independent variable of the first sub-function is electron coordinates, e.g., the first sub-function may be expressed as $U_i(r)$. The independent variable of the second sub-function is central symmetries of the electron coordinates, e.g., the second sub-function may be expressed as $U_i(-r)$.

In some examples, the electric polarization density in the above formula (1) may be expressed as formula (2) as follows:

$$P[\psi] = -\frac{1}{\Omega}\sum_i \frac{a_i}{2\pi}\text{Im}\ln\frac{\int dr\,|\psi(r)|^2\tilde{U}_i(r)}{\int dr\,|\psi(r)|^2} \tag{2}$$

In formula (2), $a_i$ denotes the lattice vector of the system, ln denotes taking the logarithm, Im denotes taking the imaginary part, r denotes the electronic coordinates, and $\int dr$ denotes integrating all electron coordinates. $\tilde{U}_i(r)$ in the formula (2) may be expressed as formula (3) or (4), and $U_i(r)$ may be expressed as formula (5).

$$\tilde{U}_i(r) = U_i(r) \tag{3}$$

$$\tilde{U}_i(r) = \frac{1}{2}\left[U_i(r) + \frac{|\psi(-r)|^2}{|\psi(r)|^2}U_i(-r)\right] \tag{4}$$

$$U_i(r) = \exp\left[ib_i\cdot\left(\sum_e r_e - \sum_I Z_I R_I\right)\right] \tag{5}$$

In formula (5), $b_i$ denotes the reciprocal vector of the system, $r_e$ denotes coordinates of an electron, $R_I$ denotes coordinates of a nucleus, and $Z_I$ denotes the number of nuclear charges of the nucleus.

In this way, by considering the central symmetry of the solid system, in embodiments of the present disclosure, when the objective function is constructed, corresponding −r is introduced for each electron coordinate r for calculation, and via weighting the first sub-function and the second sub-function, the effect of reducing statistical errors is achieved. In this way, the statistical calculation errors of the electric polarization density in the formula (2) can be reduced by using the technique of reverse sampling, thereby improving the precision of the determined wave function.

In this way, the output wave function may be updated by iteration, so as to update the objective function. Training is completed by minimizing the objective function, so as to obtain a trained neural network, that is, when the objective function is minimized, the neural network is a trained neural network corresponding to the solid system. Moreover, the output of the trained neural network (when the objective function is minimized) is the wave function of the solid system.

It can be understood that, the neural network may be used for obtaining the wave function of the solid system when an external electric field is applied. In embodiments of the present disclosure, the neural network may be referred to as a neural network model, a wave function model, a solid wave function neural network model, or similar names, which is not limited in the present disclosure.

Figure 3:
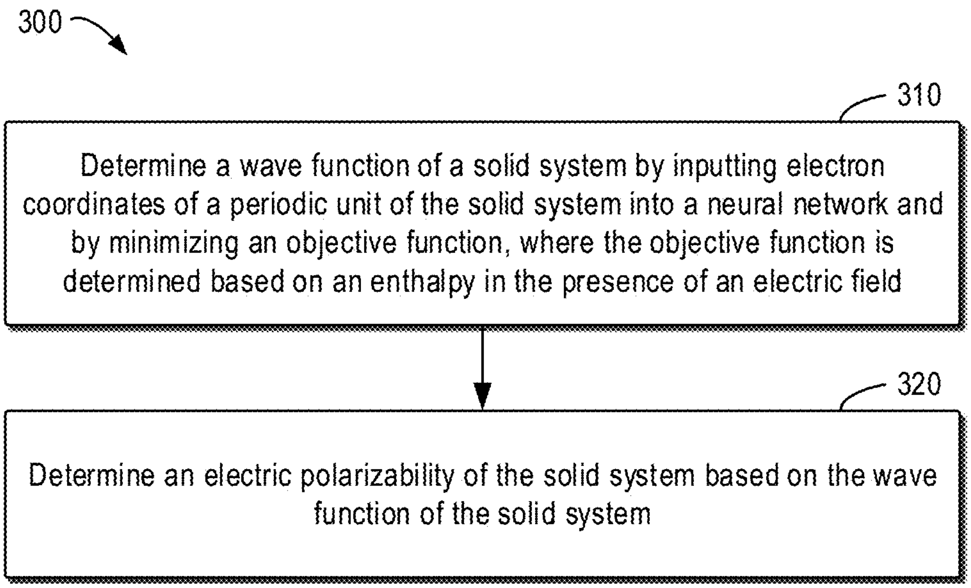
FIG. 3 illustrates a flowchart of an example use process according to embodiments of the present disclosure.

FIG. 3 illustrates a flowchart of an example use process 300 according to some embodiments of the present disclosure. In block 310, a wave function of a solid system is determined by inputting electron coordinates of a periodic unit of the solid system into a neural network and by minimizing an objective function, where the objective function is determined based on an enthalpy in the presence of an electric field. In block 320, an electric polarizability of the solid system is determined based on the wave function of the solid system.

The process of determining the wave function in block 310 is the process 100 as shown in FIG. 1. Specifically, the neural network corresponding to the solid system may be obtained by minimizing the objective function, wherein the output of the neural network is the wave function of the solid system.

In some examples, the periodic unit of the solid system may be a primitive cell of the solid system or a supercell composed of a plurality of primitive cells. In block 310, the electron coordinates of the periodic unit of the solid system may be input into the neural network, so as to obtain an output of the neural network when the objective function is minimized. In some examples, the output includes a first part and a second part, where the first part denotes a real part of the wave function and the second part denotes an imaginary part of the wave function. It can be understood that, the wave function may be obtained by combining the first part and the second part into a complex form. In some other examples, as described with reference to FIG. 2, the output of the neural network may be the wave function, which is obtained based on a combination of the real part and the imaginary part, which are obtained by the first channel, with a phase factor which is obtained by the second channel.

In block 320, a polarizability parameter of the solid system along the direction of the electric field may be determined based on the wave function of the solid system and an electric field applied to the solid system. Specifically, assuming that the direction of the electric field is a direction x, the applied electric field may be expressed as Ex.

In some examples, the electric polarization density of the solid system may be determined based on the wave function of the solid system. For example, the electric polarization density may be determined by the above formula (2) based on the wave function of the solid system. Further, a component of the electric polarization density in the direction (i.e., the direction x) of the electric field may also be obtained, e.g., the component of the electric polarization density in the direction x may be expressed as $P_x$. Correspondingly, an electric polarization parameter, i.e., polarizability α of a unit volume, may be determined based on the electric field Ex and the component of the electric polarization density in the direction x, $P_x$, as shown in formula (6) as follows:

$$\alpha = \frac{P_x}{E_x} \tag{6}$$

Optionally, the capacitivity of the solid system may be further determined based on the polarizability parameter (i.e., the polarizability α), as shown in formula (7) as follows:

$$\epsilon_\infty = 1 + \frac{4\pi\alpha}{\Omega} \tag{7}$$

In this way, the electric polarizability of the solid system may be obtained, for example, the electric polarizability is characterized by the polarizability α and/or the capacitivity $\epsilon_\infty$. In embodiments of the present disclosure, the wave function of the solid system may be obtained by using the trained neural network, then the electric polarization density is determined based on the wave function, and parameters such as the polarizability and/or the capacitivity are further obtained. The solution may quickly and efficiently determine high-precision polarizability.

FIGS. 4-7 illustrate comparison results between the present solution and existing solutions, where the solution of embodiments of the present disclosure is shown as a "Net." in the figures, and the existing solutions involved include: a Hartree-Fock (HF) self-consistent method, a density functional theory method of local density approximation (LDA), a coupled-cluster theory with single, double and perturbative triple excitations (CCSD(T)) method, and a density functional method with three parameters proposed by Becke, Lee, Yang, Parr, et al. (Becke, 3-parameter, Lee-Yang-Parr, B3LYP).

Figure 4:
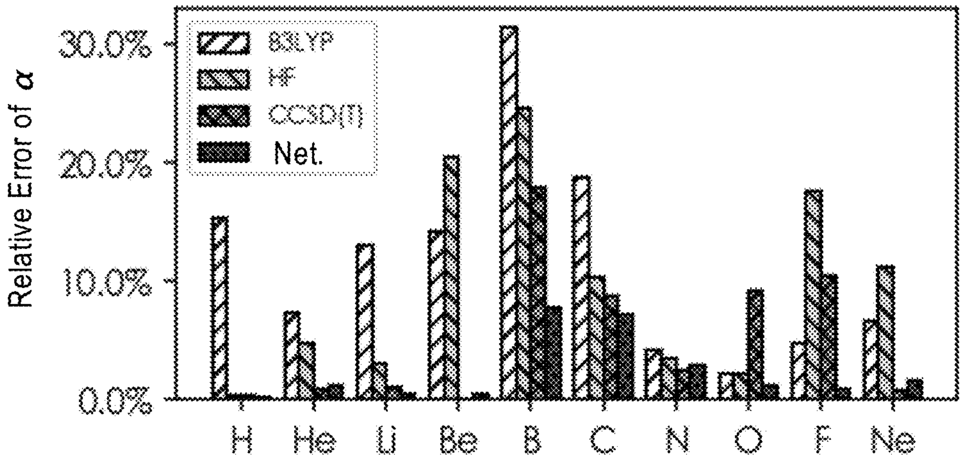
FIG. 4 illustrates a schematic diagram of a comparison result between the solution in the present disclosure and existing solutions for a single atom.

FIG. 4 illustrates a schematic diagram of a comparison result 400 between the solution in the present disclosure and the existing solutions for a single atom. The single atom shown in FIG. 4 includes hydrogen (H), helium (He), lithium (Li), beryllium (Be), boron (B), carbon (C), nitrogen (N), oxygen (O), fluorine (F), and neon (Ne). A vertical coordinate in FIG. 4 denotes a relative error of the polarizability (a). It can be seen that a relative error in the present solution is relatively small, and thus the precision of the polarizability obtained by using the present solution is high.

Figure 5:
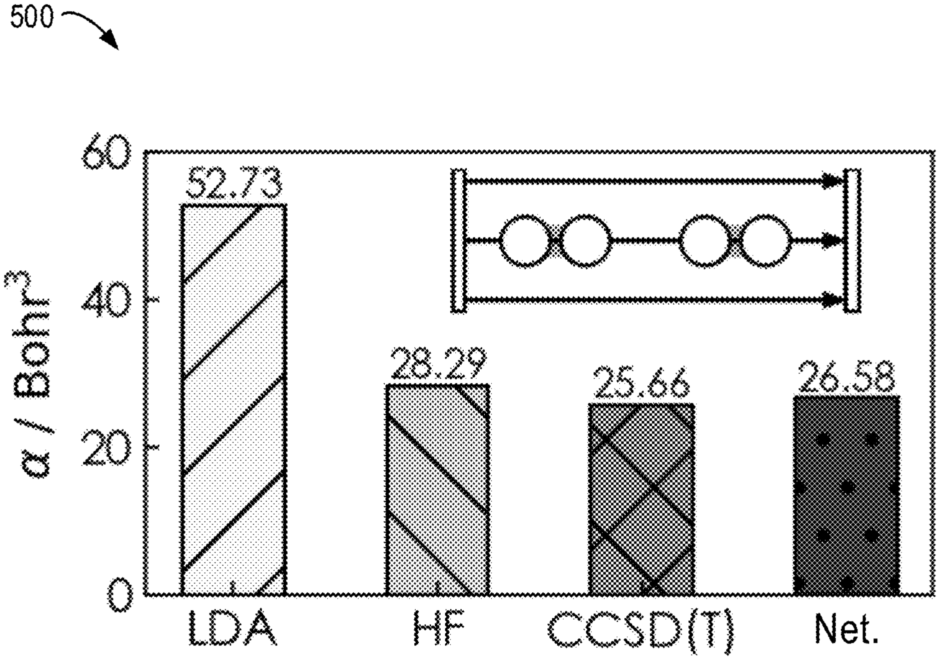
FIG. 5 illustrates a schematic diagram of a comparison result between the solution in the present disclosure and existing solutions for a one-dimensional hydrogen chain.

FIG. 5 illustrates a schematic diagram of a comparison result 500 between the solution in the present disclosure and the existing solutions for a one-dimensional hydrogen chain. As shown in FIG. 5, the polarizability (a) obtained by using the present solution is consistent with the result obtained by using the high-precision CCSD(T) method, that is, the accuracy of the polarizability obtained by using the present solution is high.

Figure 6:
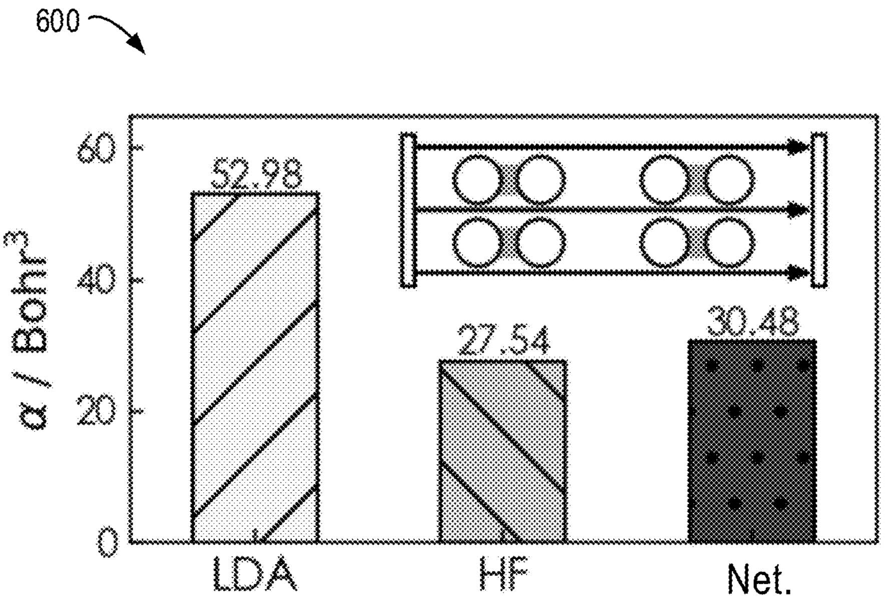
FIG. 6 illustrates a schematic diagram of a comparison result between the solution in the present disclosure and existing solutions for a two-dimensional hydrogen surface.

FIG. 6 illustrates a schematic diagram of a comparison result 600 between the solution in the present disclosure and the existing solutions for a two-dimensional hydrogen surface. Since the calculation amount of the CCSD(T) method for the two-dimensional hydrogen surface is too large to obtain a result, the CCSD(T) method is not shown in FIG. 6. As shown in FIG. 6, the polarizability (a) obtained by using the present solution is similar to the result obtained by using the HF method, thereby verifying the feasibility of calculating the two-dimensional hydrogen surface by using the present solution.

Figure 7:
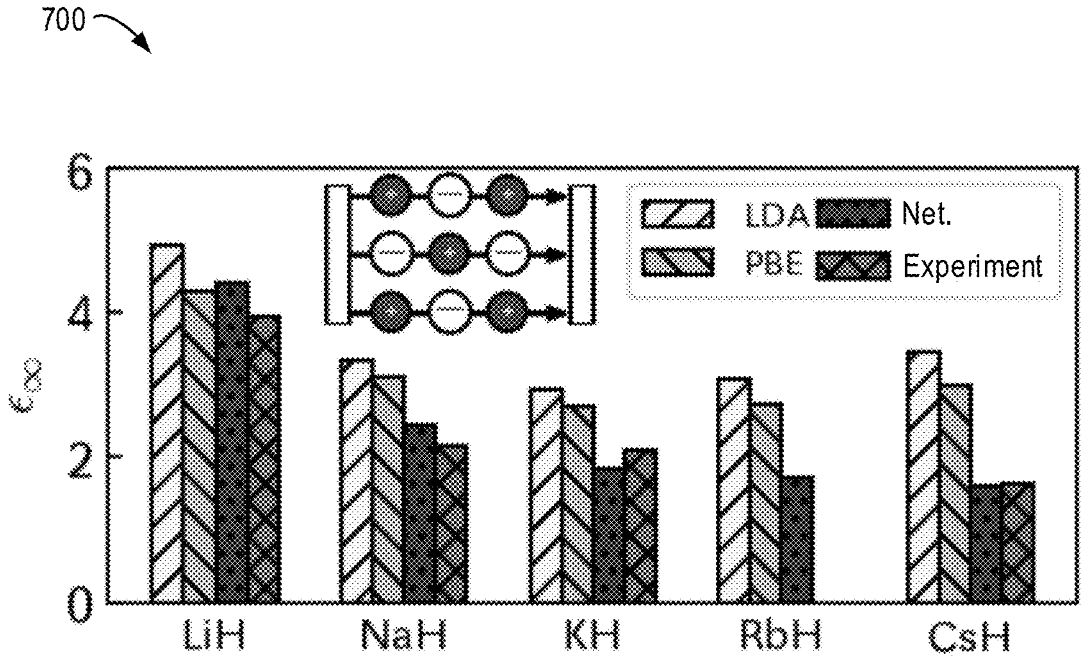
FIG. 7 illustrates a schematic diagram of a comparison result between the solution in the present disclosure and existing solutions for a three-dimensional alkali metal hydride.

FIG. 7 illustrates a schematic diagram of a comparison result 700 between the solution in the present disclosure and the existing solutions for a three-dimensional alkali metal hydride. The three-dimensional alkali metal hydride shown in FIG. 7 includes: lithium hydride (LiH), sodium hydride (NaH), potassium hydride (KH), rubidium hydride (RbH), and cesium hydride (CsH).

Specifically, FIG. 7 illustrates a comparison result of capacitivity that obtained by a plurality of solutions and experimental data. PBE in FIG. 7 denotes a PBE functional method created by Perdew, Burke, and Ernzerhof. It can be seen from FIG. 7 that, the capacitivity ($\epsilon_\infty$) obtained by using the present solution is basically consistent with the experimental result.

It should be understood that, in embodiments of the present disclosure, "first", "second", "third" and the like are merely intended to indicate that a plurality of objects may be different, but it is not excluded that two objects are the same, and thus should not be construed as any limitation to embodiments of the present disclosure.

It should also be understood that, the manners, cases, categories and division of the embodiments in embodiments of the present disclosure are merely for the convenience of description, and should not constitute special limitations, and various manners, categories, cases and features in the embodiments may be combined with each other in the case of meeting logic.

It should also be understood that, the above content is merely intended to help those skilled in the art better understand embodiments of the present disclosure, and is not intended to limit the scope of embodiments of the present disclosure. Those skilled in the art may make various modifications, changes or combinations and the like according to the above content. Such modified, changed or combined solutions are also within the scope of embodiments of the present disclosure.

It should also be understood that, the description of the above content focuses on emphasizing differences from various embodiments, the same or similar parts may refer to each other, and thus for brevity, details are not described herein again.

Figure 8:
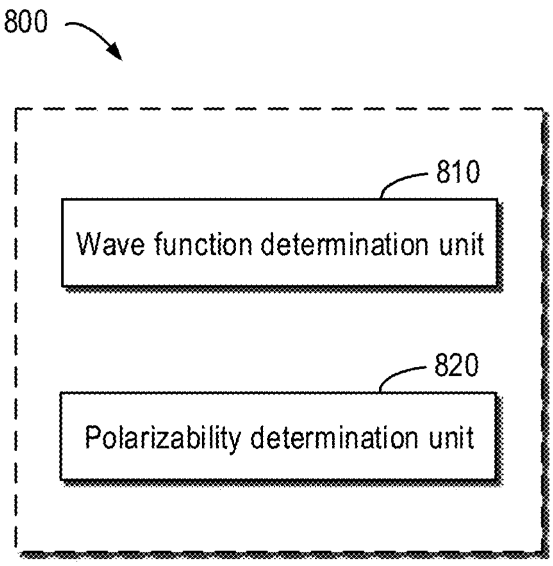
FIG. 8 illustrates a block diagram of an example apparatus according to embodiments of the present disclosure.

FIG. 8 illustrates a block diagram of an example apparatus 800 according to some embodiments of the present disclosure. The apparatus 800 may be implemented in software, hardware, or a combination thereof. In some embodiments, the apparatus 800 may be implemented as a quantum computer.

As shown in FIG. 8, the apparatus 800 includes a wave function determination unit 810 and a polarizability determination unit 820. The wave function determination unit 810 is configured to determine a wave function of the solid system by inputting electron coordinates of a periodic unit of a solid system into a neural network and by minimizing an objective function, wherein the objective function is determined based on an enthalpy in the presence of an electric field. The polarizability determination unit 820 is configured to determine an electric polarizability of the solid system based on the wave function of the solid system.

In embodiments of the present disclosure, the periodic unit of the solid system may be a primitive cell or a supercell composed of a plurality of primitive cells.

In some examples, the objective function is determined based on the enthalpy in the presence of the electric field, where the enthalpy is associated with at least one of the following: Hamiltonian, the wave function, the volume of the periodic unit, the electric field, and an electric polarization density associated with the wave function. For example, the enthalpy is expressed as a difference value between a product of the Hamiltonian and the wave function and a product of the volume, the electric field, and the electric polarization density. For example, the enthalpy may be expressed as the formula (1) as discussed above.

Exemplarily, the electric polarization density is also associated with a complex coordinate function, where the complex coordinate function is expressed as any one of the following: a first sub-function, or a weighted sum of a first sub-function and a second sub-function, where a weight of the second sub-function may be associated with the wave function. For example, the electric polarization density may be expressed as the formula (2) as discussed above. Optionally, an independent variable of the first sub-function is electron coordinates, and the independent variable of the second sub-function is central symmetries of the electron coordinates.

In some embodiments, the wave function determination unit 810 may be configured to: input the electron coordinates of the periodic unit of the solid system into the neural network, to obtain an output of the neural network, where the output includes a first part and a second part, the first part denotes a real part of the wave function, and the second part denotes an imaginary part of the wave function.

In some embodiments, the polarizability determination unit 820 may be configured to: determine a polarizability parameter of the solid system in the direction of the electric field based on the wave function of the solid system and an electric field applied to the solid system. For example, the polarizability parameter may be the polarizability $\alpha$ discussed above with reference to formula (6).

Exemplarily, the polarizability determination unit 820 may be further configured to: determine the capacitivity of the solid system based on the polarizability parameter. For example, the capacitivity may be the capacitivity $\beta_\infty$ discussed above with reference to formula (7).

The apparatus 800 of FIG. 8 may be configured to implement the process described above with reference to FIGS. 1-3, details of which are not described herein again for brevity.

In embodiments of the present disclosure, the division of modules or units is schematic and is merely logical function division, there may be other division manners in practical implementations; and in addition, various functional units in the disclosed embodiments may be integrated into one unit, or may exist alone physically, or two or more units may be integrated into one unit. The integrated unit may be implemented in the form of hardware, and may also be implemented in the form of a software functional unit.

Figure 9:
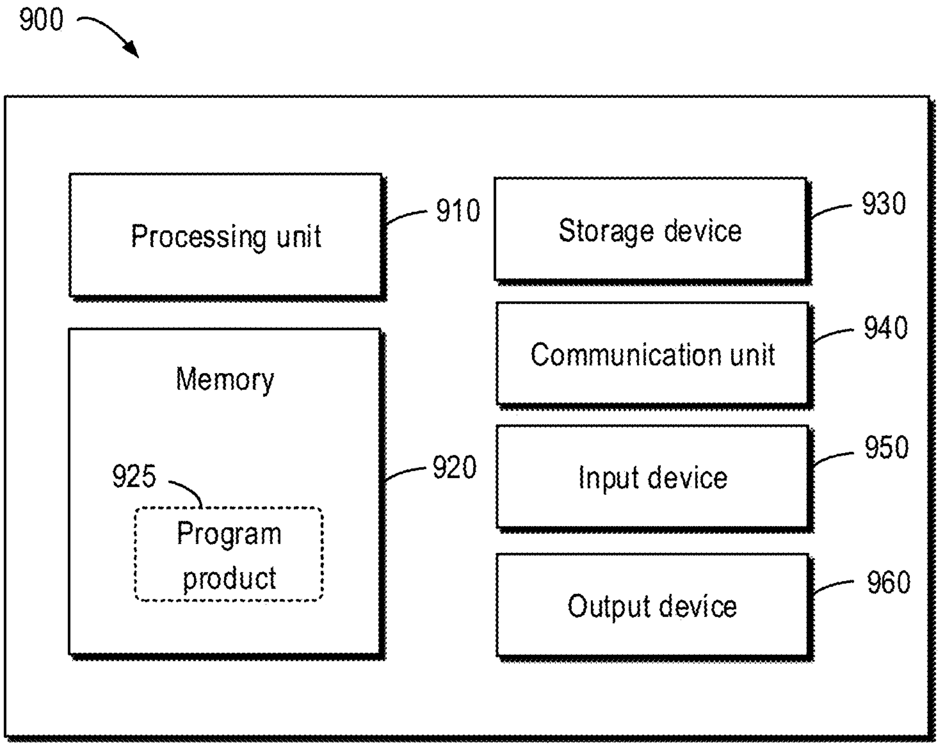
FIG. 9 illustrates a block diagram of an example device that may be used for implementing embodiments of the present disclosure.

FIG. 9 illustrates a block diagram of an example device 900 that may be used for implementing embodiments of the present disclosure. It should be understood that the device 900 shown in FIG. 9 is merely exemplary, and should not constitute any limitation on the functions and scopes of the implementations described herein. For example, the processes described above may be executed by using the device 900.

As shown in FIG. 9, the device 900 is in the form of a general-purpose computing device. Components of the computing device 900 may include, but are not limited to, one or more processors or processing units 910, a memory 920, a storage device 930, one or more communication units 940, one or more input devices 950, and one or more output devices 960. The processing unit 910 may be an actual processor or a virtual processor and may execute various processing according to programs stored in the memory 920. In a multi-processor system, a plurality of processing units execute computer-executable instructions in parallel, so as to improve the parallel processing capability of the computing device 900.

The computing device 900 generally includes a plurality of computer storage media. Such media may be any available media to which the computing device 900 may access, including, but not limited to, volatile and non-volatile media, and removable and non-removable media. The memory 920 may be a volatile memory (e.g., a register, a high-speed cache, and a random access memory (RAM)), a non-volatile memory (e.g., a read only memory (ROM), an electrically erasable programmable read only memory (EEPROM), and a flash memory), or some combinations thereof. The storage device 930 may be a removable or non-removable medium, and may include a machine-readable medium, such as a flash drive, a magnetic disk, or any other media, and the storage device may be used for storing information and/or data (e.g., training data for training) and may be accessed in the computing device 900.

The computing device 900 may further include additional removable/non-removable, and volatile/non-volatile storage media. Although not shown in FIG. 9, a disk drive for reading or writing from a removable and non-volatile magnetic disk (e.g., a "floppy disk") and an optical disk drive for reading or writing from a removable and non-volatile optical disk may be provided. In these cases, each drive may be connected to a bus (not shown) by one or more data medium interfaces. The memory 920 may include a computer program product 925, which has one or more program modules, and these program modules are configured to execute various methods or actions of various implementations of the present disclosure.

The communication unit 940 performs communication with other computing devices via a communication medium. Additionally, the functions of the components of the computing device 900 may be implemented by a single computing cluster or a plurality of computing machines, and these computing machines may perform communication via a communication connection. Accordingly, the computing device 900 may perform operations in a networked environment by using a logical connection with one or more other servers, a network personal computer (PC), or another network node.

The input device 950 may be one or more input devices, such as a mouse, a keyboard, a trackball, or the like. The output device 960 may be one or more output devices, such as a display, a speaker, a printer, or the like. The computing device 900 may also perform communication with one or more external devices (not shown) via the communication unit 940 as needed, the external devices, such as storage devices and display devices, perform communication with one or more devices that enable a user to interact with the computing device 900, or perform communication with any device (e.g., a network card, a modem, and the like) that enables the computing device 900 to perform communication with one or more other computing devices. Such communication may be executed by an input/output (I/O) interface (not shown).

According to an exemplary implementation of the present disclosure, provided is a computer-readable storage medium, on which a computer-executable instruction is stored, wherein the computer-executable instruction is executed by a processor, so as to implement the method described above. According to an exemplary implementation of the present disclosure, further provided is a computer program product, which is tangibly stored on a non-transitory computer-readable medium and includes a computer-executable instruction, wherein the computer-executable instruction is executed by a processor, so as to implement the method described above. According to an exemplary implementation of the present disclosure, provided is a computer program product, on which a computer program is stored, wherein the program implements, when executed by a processor, the method described above.

Herein, various aspects of the present disclosure are described with reference to flowcharts and/or block diagrams of methods, apparatuses, devices and computer program products implemented according to the present disclosure. It should be understood that each block of the flowcharts and/or block diagrams and combinations of the blocks in the flowcharts and/or block diagrams may be implemented by computer-readable program instructions.

These computer-readable program instructions may be provided for general-purpose computers, special-purpose computers, or processing units of other programmable data processing apparatuses, so as to produce a machine, so that when these instructions are executed by the computers or the processing units of the other programmable data processing apparatuses, an apparatus for implementing specified functions/actions in one or more blocks in the flowcharts and/or block diagrams is produced. These computer-readable program instructions may also be stored in a computer-readable storage medium, and these instructions enable the computers, the programmable data processing apparatuses and/or other devices to work in particular manners, therefore the computer-readable medium storing the instructions includes a manufacture, which includes instructions for implementing various aspects of the specified functions/actions in one or more blocks in the flowcharts and/or block diagrams.

The computer-readable program instructions may also be loaded onto the computers, the other programmable data processing apparatuses or the other devices, so as to execute a series of operation steps on the computers, the other programmable data processing apparatuses or the other devices to produce processes that are implemented by the computers, so that the instructions executed on the computers, the other programmable data processing apparatuses or the other devices implement the specified functions/actions in one or more blocks in the flowcharts and/or block diagrams.

The flowcharts and block diagrams in the drawings illustrate system architectures, functions and operations of possible implementations of systems, methods and computer program products according to a plurality of implementations of the present disclosure. In this regard, each block in the flowcharts or block diagrams may represent a part of a module, a program segment or an instruction, and a part of the module, the program segment or the instruction contains one or more executable instructions for implementing specified logical functions. In some alternative implementations, the functions annotated in the blocks may occur out of the sequence annotated in the drawings. For example, two blocks shown in succession may, in fact, be executed substantially in parallel, or the blocks may sometimes be executed in a reverse sequence, depending upon the functions involved. It should also be noted that, each block in the block diagrams and/or flowcharts, and combinations of the blocks in the block diagrams and/or flowcharts may be implemented by dedicated hardware-based systems for executing specified functions or actions, or combinations of dedicated hardware and computer instructions.

Various implementations of the present disclosure have been described above, and the above description is exemplary, not exhaustive, and is not limited to the various implementations disclosed. Many modifications and changes will be apparent to those ordinary skilled in the art without departing from the scope and spirit of the various described implementations. The terms used herein are chosen to best explain the principles of the various implementations, practical applications or improvements over technologies in the market, or to enable other ordinary skilled in the art in the art to understand the various implementations disclosed herein.

We claim:

1. A method for determining an electric polarization of a solid system, comprising:

determining a wave function of the solid system by inputting electron coordinates of a periodic unit of the solid system into a neural network and by minimizing an objective function, wherein the objective function is determined based on an enthalpy in the presence of an electric field; and determining an electric polarizability of the solid system based on the wave function of the solid system, wherein the objective function is associated with: a Hamiltonian, the wave function, a volume of the periodic unit, the electric field, and an electric polarization density associated with the wave function; and wherein the electric polarization density is determined based on the following factors: the volume of the periodic unit, coordinates of each nucleus, coordinates of each electron, a lattice vector, and a reciprocal vector.

2. The method of claim 1, wherein the enthalpy is expressed as a difference value between a product of the Hamiltonian and the wave function and a product of the volume, the electric field, and the electric polarization density.

3. The method of claim 1, wherein the electric polarization density is also associated with a complex coordinate function, and the complex coordinate function is expressed as any one of the following:

a first sub-function, or a weighted sum of the first sub-function and a second sub-function, and a weight of the second sub-function is associated with the wave function.

4. The method of claim 3, wherein an independent variable of the first sub-function is electron coordinates, and an independent variable of the second sub-function is central symmetries of the electron coordinates.

5. The method of claim 1, wherein determining the wave function of the solid system comprises:

inputting the electron coordinates of the periodic unit of the solid system into the neural network, to obtain an output of the neural network, wherein the output comprises a first part and a second part, the first part denotes a real part of the wave function, and the second part denotes an imaginary part of the wave function.

6. The method of claim 1, wherein determining the electric polarizability of the solid system comprises:

determining a polarizability parameter of the solid system along a direction of the electric field based on the wave function of the solid system and the electric field applied to the solid system.

7. The method of claim 6, further comprising:

determining a capacitivity of the solid system based on the polarizability parameter.

8. The method of claim 1, wherein the periodic unit comprises a primitive cell or a supercell composed of a plurality of primitive cells.

9. An electronic device, comprising:

at least one processing unit; and at least one memory, coupled to the at least one processing unit and storing an instruction for execution by the at least one processing unit, wherein the instruction causes, when executed by the at least one processing unit, the electronic device to execute actions, comprising:

determining a wave function of a solid system by inputting electron coordinates of a periodic unit of the solid system into a neural network and by minimizing an objective function, wherein the objective function is determined based on an enthalpy in the presence of an electric field; and determining an electric polarizability of the solid system based on the wave function of the solid system, wherein the objective function is associated with: a Hamiltonian, the wave function, a volume of the periodic unit, the electric field, and an electric polarization density associated with the wave function; and wherein the electric polarization density is determined based on the following factors: the volume of the periodic unit, coordinates of each nucleus, coordinates of each electron, a lattice vector, and a reciprocal vector.

10. The electronic device of claim 9, wherein the enthalpy is expressed as a difference value between a product of the Hamiltonian and the wave function and a product of the volume, the electric field, and the electric polarization density.

11. The electronic device of claim 9, wherein the electric polarization density is also associated with a complex coordinate function, and the complex coordinate function is expressed as any one of the following:

a first sub-function, or a weighted sum of the first sub-function and a second sub-function, and a weight of the second sub-function is associated with the wave function.

12. The electronic device of claim 11, wherein an independent variable of the first sub-function is electron coordinates, and an independent variable of the second sub-function is central symmetries of the electron coordinates.

13. The electronic device of claim 9, wherein the electronic device is caused to execute actions comprising:

inputting the electron coordinates of the periodic unit of the solid system into the neural network, to obtain an output of the neural network, wherein the output comprises a first part and a second part, the first part denotes a real part of the wave function, and the second part denotes an imaginary part of the wave function.

14. The electronic device of claim 9, wherein the electronic device is caused to execute actions comprising:

determining a polarizability parameter of the solid system along a direction of the electric field based on the wave function of the solid system and the electric field applied to the solid system.

15. The electronic device of claim 14, wherein the electronic device is caused to execute actions comprising:

determining a capacitivity of the solid system based on the polarizability parameter.

16. The electronic device of claim 9, wherein the periodic unit comprises a primitive cell or a supercell composed of a plurality of primitive cells.

17. A non-transitory computer-readable storage medium, having a computer program stored thereon, wherein the program, when executed by a processor, implements a method comprising:

determining a wave function of a solid system by inputting electron coordinates of a periodic unit of the solid system into a neural network and by minimizing an objective function, wherein the objective function is determined based on an enthalpy in the presence of an electric field; and determining an electric polarizability of the solid system based on the wave function of the solid system, wherein the objective function is associated with: a Hamiltonian, the wave function, a volume of the periodic unit, the electric field, and an electric polarization density associated with the wave function; and wherein the electric polarization density is determined based on the following factors: the volume of the periodic unit, coordinates of each nucleus, coordinates of each electron, a lattice vector, and a reciprocal vector.

* * * * *